Patented Sept. 18, 1928.

1,685,008

UNITED STATES PATENT OFFICE.

BENJAMIN L. SOUTHER, OF PITTSBURGH, AND WILLIAM A. GRUSE, OF WILKINSBURG, PENNSYLVANIA, ASSIGNORS TO GULF REFINING COMPANY, OF PITTSBURGH, PENNSYLVANIA, A CORPORATION OF TEXAS.

PROCESS OF TREATING SLACK WAX.

No Drawing. Application filed February 17, 1926. Serial No. 88,906.

This invention relates to processes of treating slack wax; and it comprises a method of directly obtaining wax and oil from slack wax resulting from pressing operations and similar materials wherein such a material is cut up or comminuted by cutting or grinding apparatus to form a fluent pumpable mass and is thereafter mechanically separated into a solid and a liquid portion; all as more fully hereinafter set forth and as claimed.

In the usual manufacture of paraffin wax from petroleum, paraffin distillate is chilled to cause a crystallization of the contained wax which may amount to 20 per cent or so and the oil is separated from the residual crystallized wax. There is more liquid than solid and mechanical separation offers no difficulty. In the usual operation the chilled mass is pressed in a filter press or the like, giving liquid oil for lubricating oil stock and cakes of solid wax. In the art this material resulting from a pressing of chilled paraffin distillate is called "slack wax." While the removal of liquid by pressure in this operation is carried as far as is feasible, it is nevertheless not complete. The solid slack wax still contains oil, often 20 to 40 per cent and must be subjected to further treatment to remove the residual oil and to regain waxes of various melting points. In the usual operation, the slack wax is melted and cooled again to such a temperature as will cause it to solidify to a solid cake. In so doing much of the material, but not all, crystallizes, giving a sort of solid magma containing distributed liquid. In practice, further treatment is by sweating; that is, the material is placed in a hot chamber and the liquid components are allowed to drain away from the solid, an operation requiring considerable time. The sweating process may be, and frequently is, repeated; the sweated hard wax being remelted, recrystallized and once more sweated, while the oils sweated from the first stage may be again chilled for crystallization and resweating. The process is tedious and time consuming and requires extensive chamber space.

Slack wax comes from the first presses as a solid cake and is usually regarded as consisting of a mixture of oil carrying wax in solution and wax containing oil in solid solution. We have found that this view is incorrect; that in slack wax at ordinary temperatures, the oil and wax exist as two distinct phases, one liquid and one solid, with the liquid phase containing substantially all the oil present, and no great amount of dissolved wax. The solid phase contains practically all the high melting wax in a nearly oil-free condition. Further pressure at the low temperature of recovery of the wax removes no more oil. This is probably due partly to the fact that the solution of soft wax in oil is solid at this temperature, and partly to the fact that such oil as remains liquid is entrapped in the crystal mass in such a way that it cannot be pressed out. An ordinary temperatures more of the material is liquid, but no practicable amount of the liquid can be removed by direct pressure on the slack wax because of the above mentioned fact, that the intermeshing crystals retain the liquid. We have found that if the structure which is presumably due to the interlocking of the crystals, be destroyed by comminution, cutting or grinding the two phases are mechanically separable. As separated these phases consist respectively of solid, practically oil-free wax, and oil saturated with wax at the prevailing temperature.

The structure of remelted and recrystallized slack wax is like that of the wax coming directly from the presses and the same considerations apply; it is possible to cut it up and obtain a fluent pumpable mass easily handled in a filter press or centrifugal. Similarly, secondary products obtained from filtrates or cakes by chilling or remelting and chilling as the case may be, are amenable to our process. In every case the temperature of separation is important.

In the present invention slack wax is cut up, minced or hashed in any suitable way to form a fluent mass, liquid enough to enable it to be readily pumped and handled. Liquid and solid in this mass are mechanically separable in convenient ways. As a matter of fact, simple gravitational separation is possible. On standing some hours, at say 80° F., minced slack wax will spontaneously separate to a considerable extent into a lower oil layer and an upper floating wax layer. However, for the sake of speed it is better to use the ordinary mechanical devices, such as filter presses or centrifugals for effecting separation. With either, solid wax can be obtained carrying only a small amount of oil, say, 5 per cent or so, existing as a film on crystal surfaces.

In practical embodiments of the present invention, slack wax is cut or ground by apparatus of any suitable type. If a filter press is to be used subsequently, the slack wax may be the cake coming directly from the original presses. As a result of the comminution, the solids in the mass are reduced to a fine granular material and this with the oil present forms a sort of suspension or "magma" of sufficient fluidity to be handled like a liquid at ordinary temperatures. It can readily be pumped. The comminution and handling may conveniently be done at room temperature. A temperature of 78° F., is often convenient. Slack wax coming from the original presses and at a temperature of about 30° F. may be warmed to bring it to about 75° F., cut up and then further treated. After the comminution, the material is usually a frothing, fluent mass. A good type of comminution may be obtained by stirring solid slack wax with cutting blades mounted on a shaft, the blades rotating at a peripheral speed of about 250 feet per minute. A grinding device resembling a food chopper has been used with better results. The fluent mass is then pumped through a filter press or delivered to a centrifugal machine. An ordinary type of basket machine with perforated walls may be used.

In one specific embodiment of the present process, a quantity of ordinary slack wax made by the coking dry distillation of reduced mid-continent crude oil and the chilling and pressing of the paraffin distillate, was cut up and beaten at 78° F. by a rapidly rotating propeller stirrer. After less than five minutes agitation, the solid wax was converted into a fluid foaming material which flowed under its own weight. This was pumped at the same temperature, 78° F., to a filter press and pressed. The pressure was 225 pounds per square inch. The filtrate contained a small amount of persistent foam readily broken by gentle heating. It showed a cold test of 80° F., that is approximately the filtering temperature. The cake was solid dry wax of melting point 124° F. It contained 4.7 per cent oil and the yield was 60 per cent of the original slack wax. To make secondary products, the process is repeated. In this particular case the oil in the filtrate contained very little hard wax, but it contained such softer wax as was fusible or soluble at the temperature of operation, 78° F. This soft wax and any liquid wax contained could be obtained by repetition of the process at a lower temperature. Similarly, the process could be repeated on the wax, the cake being melted, resolidified, comminuted and repressed at suitable temperatures. These repetitions were useful where specific grades of wax were wanted. In the example just given, a hard wax was the main product desired.

As one specific operation using a repetition of our process a slack wax containing about 37 per cent of oil was beaten or cut by a rapidly rotating stirrer for about a minute; long enough to convert the cake into a fluent mass. This was pumped to a filter press at a temperature of 86° F., and gave a cake composed of wax of 122° F. melting point and as filtrate a liquid material. The wax yield was 40 per cent. The filtrate was chilled to 44° F. at which temperature it set to a hard solid mass. This was beaten to a fluid condition in the same type of apparatus and pumped to a filter press and filtered at a temperature of 44° F. A cake of wax was obtained of melting point of 104° F., with a yield of 27 per cent of the original slack wax. This wax was warmed to 78° F., beaten to a fluid condition and pumped to filter presses at 78° F. The new cake resulting was of wax with a melting point of 111° F., the yield being 18 per cent of the original slack wax.

In the examples just given a filter press was used, but in each case a centrifugal could be substituted with like results. Slack wax coming directly from the presses may be minced and allowed to flow into a centrifugal. It may be however noted that sometimes melting and resolidifying before mincing, gives material easier handled and easier washed clean in a centrifugal; this being probably due to a difference in the crystal fragments obtained. Centrifugals with imperforate walls operating on the principle of the ordinary liquid separators may be used; but their use offers no advantage over that of the ordinary type of machine having a perforated filtering wall. This type of machine offers the advantage of allowing washing the separated solids in order to get rid of adhering residual oil. The washing liquid should be one of volatile nature and having but little solvent action on wax. With spray washing, however, the solvent power of the liquid is really not very material. The drained wax in the centrifugal can be sprayed with benzene or petroleum naphtha and the oil content lowered considerably. Such liquids as acetone, ethylene dichloride and others having little solvent power on wax, may be conveniently used. They may also be used in a final wash of the cake in a filter press; that is, be used to displace residual oil.

In one typical embodiment of our invention, using a centrifugal, slack wax from the presses was melted and allowed to solidify in layers four inches deep. It was then ground in an apparatus resembling a food chopper at a temperature of 78° F., and was then allowed to flow to a centrifugal at the same temperature. Rotation was continued for about 20 minutes, giving a 44 per cent yield of wax. The product melted at 122° F., and contained 4.9 per cent oil.

The control of air temperature during the centrifuging has been observed to be important. Where the air is several degrees lower in temperature than the wax under treatment, the solution of soft wax in oil, which is being drained off, may soldify in part, interfering greatly with the efficiency of draining. It is desirable to keep the air temperature several degrees higher than that of the wax under treatment. The temperature of the wax at the time of processing has also a noticeable influence on the efficiency of draining, as well as on the yield of oil-free wax. This is shown by the following results:

| Temperature of wax | Oil content | Yield oil-free wax |
|---|---|---|
| °F. | Per cent | Per cent |
| 79 | 3.5 | 47.8 |
| 75 | 4.5 | 49. |
| 70 | 6. | 51.2 |

The influence of time of whirling in the centrifugal on the degree of draining is important. Longer time gives more thorough draining, and an optimum time may be selected. Twenty minutes is often a suitable period.

In lieu of directly pumping the comminuted slack wax to a filter press or centrifugal, it may first be admixed with a little diluent liquid having slight solvent power for wax. Such a diluent liquid will lower the viscosity of the oil, thus favoring better drainage, and will lower the total amount of oil adhering to the crystal surfaces. Ethylene dichloride is a suitable liquid, while various proportions of acetone, alcohol and mixtures of these with benzene may be employed. In choosing these solvents, proper attention must be given to the solubility of both oil and wax.

In use some of these diluent liquids, such as ethylene dichloride, are better adapted for working at low temperature than for working at room temperature.

This application is a continuation in part of our application Serial No. 54,132, filed September 2, 1925. For a type of apparatus suitable for comminuting the wax, reference may be had to the patent to Gruse and Faragher, patented March 27, 1928, No. 1,663,592, on application Serial No. 746,374, filed October 28, 1924.

What we claim is:—

1. In the treatment of slack wax, the process which comprises, comminuting a magma of solid slack wax containing oil to a fluent consistency, and mechanically separating the liquid and solids of the comminuted material.

2. In the manufacture of wax from petroleum distillates, the process which comprises chilling such a distillate to crystallize wax therefrom, pressing said wax to separate oil and form a solid slack wax containing oil, comminuting the solid slack wax to convert it into a fluent mass and mechanically separating the liquids and solids of such mass.

3. In the treatment of slack wax, the process which comprises, comminuting a magma of solid slack wax containing oil to a fluent consistency, and filter-pressing to separate liquid from the crystallized wax.

4. In the manufacture of wax from petroleum distillates the process which comprises chilling such a distillate to crystallize wax therefrom, pressing said wax to separate oil from solid wax, thereby forming slack wax containing oil, comminuting the solid press cake to a fluent consistency and again pressing to express further liquid.

In testimony whereof, we have hereunto affixed our signatures at Pittsburgh, Pennsylvania, this 15th day of February, 1926.

BENJAMIN L. SOUTHER.
WILLIAM A. GRUSE.